(No Model.) 2 Sheets—Sheet 1.
E. INGOLD.
MINING MACHINE.
No. 419,199. Patented Jan. 14, 1890.
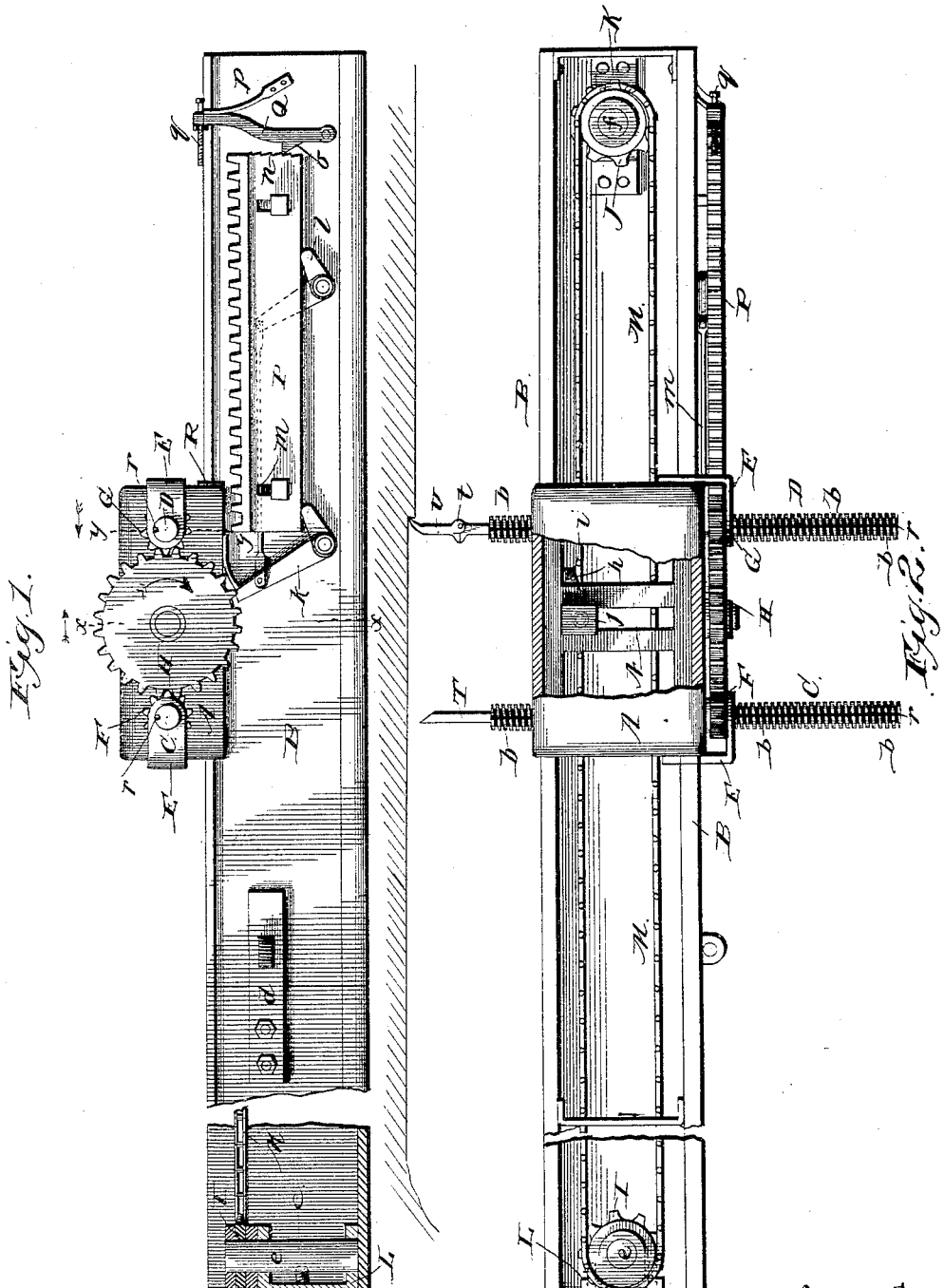
Witnesses:
Geo. J. Thorpe
Edwin S. Clarkson
Inventor:
Eugene Ingold
by
Johnston Reinohl and Dyre
Attorneys (No Model.) 2 Sheets—Sheet 2.

E. INGOLD.
MINING MACHINE.

No. 419,199. Patented Jan. 14, 1890.

Witnesses:
Geo. J. Thorpe
Edwin S. Clarkson

Inventor:
Eugene Ingold
by
Johnston Reinohl and Dyre
Attorneys.

UNITED STATES PATENT OFFICE.

EUGENE INGOLD, OF PITTSBURG, PENNSYLVANIA.

MINING-MACHINE.

SPECIFICATION forming part of Letters Patent No. 419,199, dated January 14, 1890.

Application filed September 30, 1889. Serial No. 325,590. (No model.)

*To all whom it may concern:*

Be it known that I, EUGENE INGOLD, a citizen of the United States, residing at Pittsburg, in the county of Allegheny and State of Pennsylvania, have invented certain new and useful Improvements in Mining-Machines; and I do hereby declare the following to be a full, clear, and exact description of the invention, such as will enable others skilled in the art to which it appertains to make and use the same.

My invention relates to mining-machines, and has for its object the construction of a portable and substantial machine for undercutting coal or other minerals, but more especially designed for use in coal-mines.

The invention will be hereinafter described, and particularly pointed out in the claims.

Figure 7:
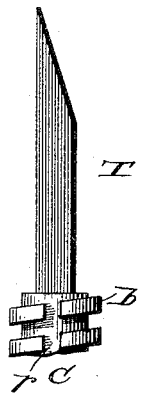
Figure 3:
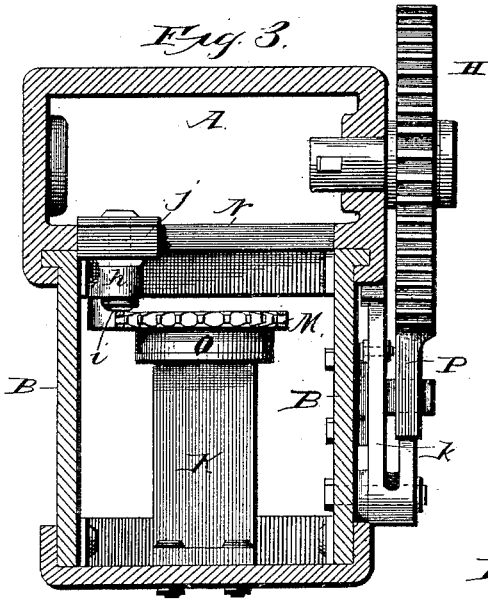
Figure 4:
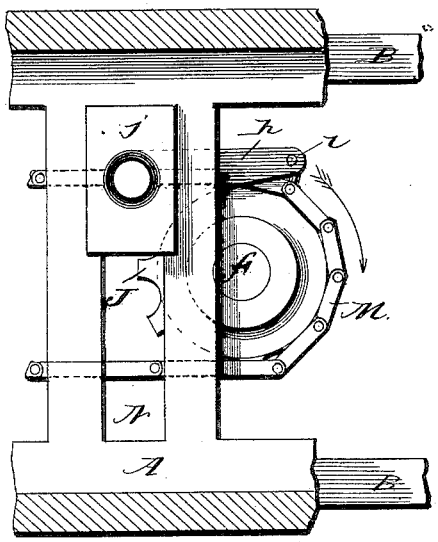
Figure 5:
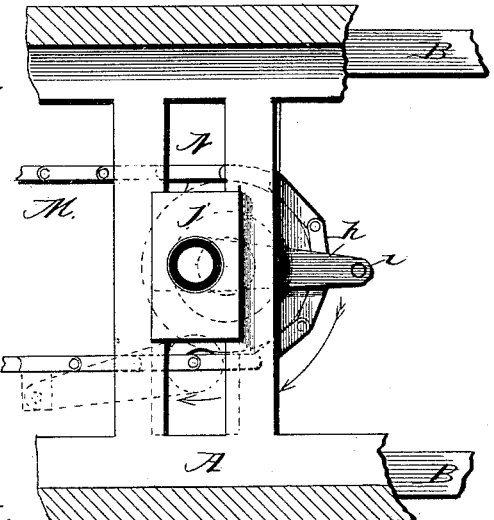
Figure 6:
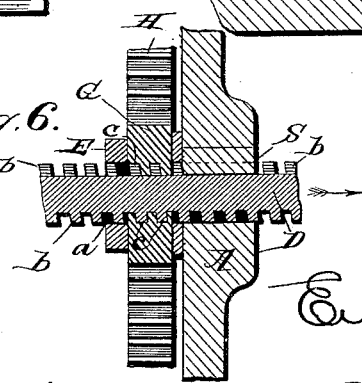

In the accompanying drawings, which form part of this specification, Figure 1 represents a side elevation of my invention, partly in section; Fig. 2, a plan view of the same; Fig. 3, a vertical section on line $x$ $x$, Fig. 1; Figs. 4 and 5, longitudinal sectional views of the truck on an enlarged scale, showing the connection with drive-chain; Fig. 6, a vertical section on line $y$ $y$, Fig. 1, looking in the direction of arrow; and Figs. 7 and 8, side and edge views, respectively, of the cutting-tools.

Reference being had to the drawings and the letters thereon, A indicates a car or truck, which reciprocates upon a track or way B. The truck A is preferably made of cast metal, hollow in form, as shown, and is provided with parallel tool-shafts C D, supported in opposite sides thereof, and piercing the truck in a direction at right angles to its length.

To either side of the truck A are secured, by bolts or otherwise, L-shaped brackets E, one arm of each of which runs parallel to the side of the truck, and near the ends thereof are provided apertures $a$, which form additional bearings for the tool-shafts C D. On each of these shafts, between the brackets E and side of the truck A, are mounted pinions F G, which mesh with a gear-wheel H, journaled in the center of the side of the truck, forming a spur-gear by which the tool-shafts C D are advanced laterally through the medium of a male screw $b$ on the shafts and a female screw $c$, by which the pinions F G are tapped, and with which the male screws $b$ engage, as will hereinafter more fully appear.

The track or way $b$ may be made of wrought-iron in sections of any suitable number and length, bolted together, as at $d$, and in both ends thereof is secured a vertical shaft $e\,f$, bearing sprocket-wheels I J, respectively, the latter being journaled in a fixed support K and the former in a movable frame L, operated by screws $g$ in the end of the way B for taking up slack in the drive-chain M, which runs over both sprocket-wheels, for the purpose of communicating motion to the truck A. This is accomplished by means of a link $h$, swiveled to a lug on chain M at $i$, and at its opposite end to the center of a guide-block $j$, which is left free to slide transversely in a slot or way N, formed in the bottom of truck A. The chain M in turn is propelled by any suitable motor located at a distance from the "miner" through a belt running over the pulley O, keyed to shaft $f$ below the sprocket J. On the outside of the way B is a vertically-adjustable rack P, supported upon one arm of two bell-crank levers $k$ $l$, the other arms of each of which pass back of said rack and are connected by rod $m$, in order that they may work in unison. The outer end of rack P is provided with a notch or notches $n$, which engage a tooth $o$ on the lever Q, secured at its base to the frame or way B, and held normally thus engaged by the spring $p$, as shown in Fig. 1.

In the upper end of lever Q is a set-screw $q$, against which the buffer-plate R, secured to the end of truck A, strikes when the latter has advanced the full extent of its stroke, for the purpose of releasing the rack P and allowing it to gravitate out of engagement with the gear H.

Throughout the length of tool-shafts C and D is cut a groove $r$, equal in depth to the thread of the screws constituting part of said shafts, in which rests a tongue cast integral with the frame A, or a key secured therein, as S, Fig. 6, for the purpose of guiding the tool-shafts in their lateral movement and preventing them from revolving.

Figure 8:
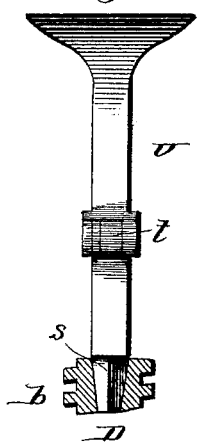

The outer extremities of tool-shafts C D are provided with recesses $s$, Fig. 8, to receive the squared ends of bits or tools T U. These are similar in form, a side view and front elevation thereof being shown by Figs. 7 and 8, respectively, the only difference being that tool U is one inch longer than T and is made in two sections joined by a knuckle-joint *t*.

The construction of parts being substantially as described, the operation is as follows: Power is applied through belt or pulley O, thus imparting motion to the drive-chain M, to which truck A is secured, and must therefore advance also. For the purpose of illustration, I will suppose the truck at the extreme end of the track or way B, with the cutting-tool U embedded one-half of an inch in the coal to be operated upon. As the chain and truck advance simultaneously a "channel" is cut by tool U in the base of the vein, which will measure about the length of the machine, one-half of an inch in depth, and about one and one-half inches in width. When this cut is completed and the truck A has reached the position shown in Figs. 1 and 2, the gear-wheel H engages with rack P, causing the former to turn in the direction of the arrow thereon and operate upon the pinions F G to revolve them in the opposite direction. The pinions F G, each being tapped with a female screw, four threads to an inch, engaging with a male thread of corresponding pitch on the tool-shafts C D, serve to advance said shafts one-half of an inch through the medium of gear-wheel H each time the latter travels the length of rack P, at which point the buffer-plate R on the end of truck A strikes the set-screw *q*, disengaging the tooth *o* and allowing the rack P to gravitate out of contact with the gear H, the tool-shafts by this time having advanced a sufficient distance. The chain M continues its movement, taking with it the truck A, secured thereto by a link *h*, swiveled to said chain at one end and to a sliding block *j* at the other, in a position to move above the sprockets, but below the bottom of the truck. Now, when the truck reaches the sprocket J, as shown in Fig. 4, one end of the link *h* passes around same above the surface thereof, and block *j*, carrying the opposite end of link *h*, slides to the position shown by Fig. 5. This movement is continued until the block and link reach the position shown by dotted lines in Fig. 5, when the line of draft is again with the chain and the truck commences a return trip along the track or way B, with the cutting-tool T embedded in the coal and tooth U out of contact and trailing or dragging, as allowed by the knuckle-joint *t*. When the truck A reaches about the position shown by Fig. 1 on the return trip, a lug or projection on the bottom thereof strikes the vertical arm of bell-crank lever *k*, forcing it into the position shown, thus elevating the short arms of levers *k* and *l*, and with them rack P, which is then engaged and held in this position by tooth *o* on lever Q, as shown, ready to engage the gear H and again advance the tools at the completion of the next cut. This operation is repeated, the tools cutting alternately, each cut being one-half of an inch deeper than the preceding one, until the tool-shafts have been advanced automatically to their full length, by which time the vein is undermined a suitable distance, and the coal or other mineral may be blasted down with great facility. The machine may then be moved up and the operation repeated.

Having thus fully described my invention, what I claim is—

1. In a mining-machine, a truck carrying a cutting-tool, a way or track on which said truck reciprocates, and means for propelling the truck, in combination with spur-gearing, a male and a female screw, a rack for advancing the cutting-tool, and means for throwing the rack in and out of engagement with the gear, substantially as described.

2. In a mining-machine, a truck carrying a cutting-tool, a way or track on which said truck reciprocates, and means for propelling the truck, in combination with spur-gearing, a male and a female screw connected therewith, a vertically-adjustable rack supported upon a bell-crank, and a lever having a tooth for engaging a notch in the end of the rack, adapted to be automatically disengaged therefrom, substantially as described.

3. In a mining-machine, a truck carrying a cutting-tool, a way or track, and means for propelling the truck thereon, in combination with spur-gearing, a male and a female screw connected therewith, a vertically-adjustable rack supported upon bell-crank levers connected by a rod, and a lever carrying a set-screw and a tooth or projection, the latter being held normally in engagement with a notch in the end of said rack by a spring, substantially as described.

4. In a mining-machine, a truck provided with a cutting-tool and a buffer-plate, a way or track, and means for propelling the truck thereon, in combination with spur-gearing, a male and a female screw connected therewith, a vertically-adjustable rack supported upon bell-crank levers connected by a rod, and a lever carrying a set-screw and a tooth or projection, the latter being held normally in engagement with a notch in the end of said rack by a spring, substantially as described.

5. In a mining-machine, a truck provided with a transverse track in its base and cutting-tools, in combination with a track or way wherein are journaled sprockets for carrying a drive-chain to which the truck is connected, means for advancing the cutting-tools, consisting of a gear-wheel meshing periodically with a rack and constantly with two pinions, each tapped with a female screw engaging with male screws on the tool-shafts, the latter being provided with longitudinal grooves with which projections on the truck engage to prevent said shafts revolving, and a motor for driving the sprockets, substantially as described.

6. In a mining-machine, a truck provided with a cutting-tool, a transverse track in its base, and a buffer-plate on one end thereof, in combination with a track or way wherein are journaled sprockets carrying a drive-chain to which the truck is connected by a link, one end thereof arranged to slide in the transverse way in said truck, spur-gearing, a male and a female screw connected therewith, a vertically-adjustable rack supported upon bell-crank levers connected by a rod, a lever carrying a set-screw and a tooth or projection, the latter being held normally in engagement with a notch in the end of said rack by a spring, and a motor for driving one of the sprockets, substantially as described.

7. In a mining-machine, a truck provided with a cutting-tool, a transverse track in its base, and a buffer-plate on one end thereof, in combination with a track or way wherein are journaled sprockets, one of which is adjustable longitudinally for carrying a drive-chain to which the truck is connected by a link, one end thereof being swiveled to a block arranged to slide in the transverse way in said truck, spur-gearing, male and female screws connected therewith, a vertically-adjustable rack supported upon bell-crank levers connected by a rod, a lever carrying a set-screw and a tooth or projection, the latter being held normally in engagement with a notch in the end of said rack by a spring, and a motor for driving one of the sprockets, substantially as described.

8. In a mining-machine, a truck provided with a transverse track in its base, a buffer-plate, and cutting-tools, one of which is made in two sections, connected by a knuckle-joint, and both bearing longitudinal grooves, in which projections on the truck engage to prevent the shafts revolving, in combination with a track or way wherein are journaled sprockets, one of which is adjustable longitudinally, for carrying a drive-chain to which the truck is connected by a link, one end thereof being swiveled to a block arranged to slide in the transverse way in said truck, a gear-wheel meshing with two pinions, each tapped with a female screw engaging with male screws on the tool-shafts, a vertically-adjustable rack supported upon bell-crank levers connected by a rod, a lever carrying a set-screw and a tooth or projection, the latter being held normally in engagement with a notch in the end of said rack by a spring, and a motor for driving one of the sprockets, substantially as described.

In testimony whereof I affix my signature in presence of two witnesses.

EUGENE INGOLD.

Witnesses:
   JAMES G. CORCORAN,
   E. L. PETERSON.